(12) United States Patent
Movida et al.

(10) Patent No.: US 8,489,974 B2
(45) Date of Patent: Jul. 16, 2013

(54) SYSTEM, METHOD AND COMPUTER PROGRAM PRODUCT FOR RESOLVING A DATA CONFLICT

(75) Inventors: Mark Movida, Berkeley, CA (US); Didier Prophete, San Francisco, CA (US); Ronald F. Fischer, San Francisco, CA (US); Marni Gasn, San Mateo, CA (US); Anshu Agarwal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 175 days.

(21) Appl. No.: 13/116,829

(22) Filed: May 26, 2011

(65) Prior Publication Data

US 2011/0302479 A1  Dec. 8, 2011

Related U.S. Application Data

(60) Provisional application No. 61/352,274, filed on Jun. 7, 2010.

(51) Int. Cl.
*G06F 11/00* (2006.01)

(52) U.S. Cl.
USPC .......................... 714/798; 714/707

(58) Field of Classification Search
USPC .................. 370/513; 709/248, 221; 707/610, 707/201, 611; 714/798, 775, 789, 707
See application file for complete search history.

(56) References Cited

U.S. PATENT DOCUMENTS

| | | | |
|---|---|---|---|
| 6,546,026 B1 * | 4/2003 | Goeddel | 370/513 |
| 6,560,655 B1 * | 5/2003 | Grambihler et al. | 709/248 |
| 6,892,210 B1 * | 5/2005 | Erickson et al. | 1/1 |
| 7,209,929 B2 | 4/2007 | Dominguez, Jr. et al. | |
| 7,543,047 B2 * | 6/2009 | Park et al. | 709/221 |
| 7,698,160 B2 | 4/2010 | Beaven et al. | |
| 7,797,273 B2 * | 9/2010 | Levi et al. | 707/609 |
| 7,925,625 B2 * | 4/2011 | Mathew et al. | 707/610 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2005/0055382 A1 * | 3/2005 | Ferrat et al. | 707/201 |
| 2005/0065925 A1 | 3/2005 | Weissman et al. | |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2010/0106685 A1 * | 4/2010 | Ott et al. | 707/611 |

OTHER PUBLICATIONS

U.S. Appl. No. 60/828,192, filed Oct. 4, 2006.

* cited by examiner

*Primary Examiner* — David Ton
(74) *Attorney, Agent, or Firm* — Zilka-Kotab, PC (57) ABSTRACT

In accordance with embodiments, there are provided mechanisms and methods for resolving a data conflict. These mechanisms and methods for resolving a data conflict can enable an improved user experience, increased efficiency, time savings, etc.

25 Claims, 8 Drawing Sheets

SYSTEM, METHOD AND COMPUTER PROGRAM PRODUCT FOR RESOLVING A DATA CONFLICT

CLAIM OF PRIORITY

This application claims the benefit of U.S. Provisional Patent Application 61/352,274, entitled "Methods and systems for resolving conflicting client/server data in a multi-tenant database environment," by Movida et al, filed Jun. 7, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data storage, and more particularly to data synchronization.

BACKGROUND

The subject matter discussed in the background section should not be assumed to be prior on merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire to store one or more copies of data in a plurality of locations. For example, identical data records may be stored both at a client of a system as well as a server of the system, and may be periodically synchronized (e.g., for purposes of maintaining updated data, etc.). Unfortunately, traditional data synchronization techniques have been associated with various limitations.

Just by way of example, conflict may arise during the synchronization of data between locations. For example, alterations may have been made simultaneously to the same data elements at different locations. Accordingly, it is desirable to effectively manage and resolve such data conflicts.

BRIEF SUMMARY

In accordance with embodiments, there are provided mechanisms and methods for resolving a data conflict. These mechanisms and methods for resolving a data conflict can enable an improved user experience, increased efficiency, time savings, etc.

In an embodiment and by way of example, a method for resolving a data conflict is provided. In one embodiment, a synchronization error is detected within a system. Additionally, it is determined that the synchronization error includes a data conflict. Further, the data conflict is resolved.

While one or more implementations and techniques are described with reference to an embodiment in which resolving a data conflict is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for resolving a data conflict.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for resolving a data conflict will be described with reference to example embodiments.

Figure 1:
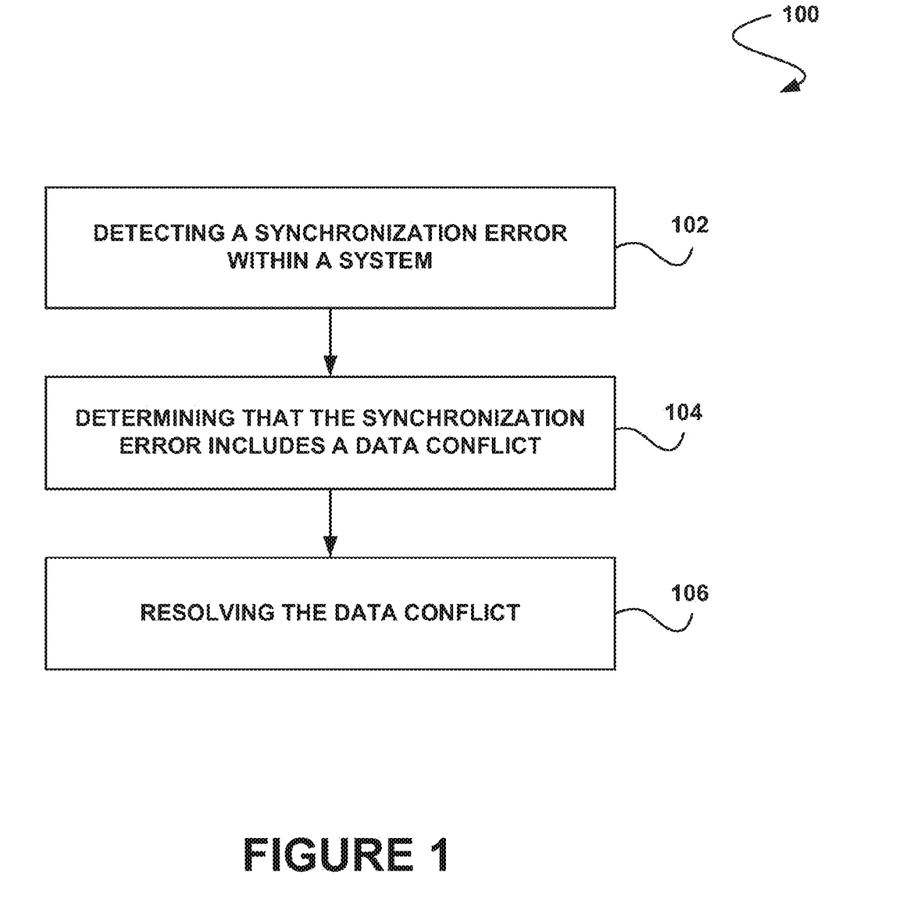
FIG. 1 illustrates a method for resolving a data conflict, in accordance with one embodiment.

FIG. 1 illustrates a method 100 for resolving a data conflict, in accordance with one embodiment. As shown in operation 102, a synchronization error is detected within a system. In one embodiment, the system may include one or more clients. For example, the system may include a desktop computer, a laptop computer, a handheld device (e.g., a cell phone, personal digital assistant (PDA), etc.), or any other device capable of performing computation. In another embodiment, the system may include one or more servers. For example, the system may include one or more server computers, a cloud computing environment, a multi-tenant on-demand database system, etc. In yet another embodiment, the one or more clients and the one or more servers of the system may communicate utilizing a network.

Additionally, in one embodiment, the synchronization may include the exchange of data between a client of the system and a server of the system. For example, a copy of the same data may be stored at both the client and the server of the system, and both copies may be periodically synchronized. In this way, it may be ensured that the stored data is accurate and current. In another embodiment, the synchronization may be performed utilizing one or more application programming interface (API) calls. In yet another embodiment, the synchronization may be performed in response to data being saved within the system (e.g., at the client, at the server, etc.).

Further, in one embodiment, the synchronization error may include any error that is encountered during synchronization. For example, the synchronization error may include one or more failed API calls. In another embodiment, a message may accompany the synchronization error. For example, an error message may be received in response to a failed synchronization between a client and server within the system.

Further still, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, it is determined that the synchronization error includes a data conflict. In one embodiment, it may be determined that the synchronization error includes a data conflict by identifying an error message. For example, an error message (e.g., an error code, a message string, etc.) received in response to the synchronization error may indicate that such synchronization error is the result of a data conflict. Of course, however, the synchronization error may be determined to include a data conflict in any manner. In another embodiment, the determining may be performed by a fault handler of the system.

Additionally, in one embodiment, the data conflict may include a conflict of data between a server of the system and a client of the system. For example, identical copies of data may be stored at both the client and the server of the system, and after a first synchronization is performed, the data copy stored on the client may be altered (e.g., by a user editing the data, deleting the data, etc.). Additionally, after the first synchronization is performed, the data copy stored on the server may also be altered in a different manner than the data copy stored on the client. In another example, the data copy stored on the server may be altered before the alteration of the data copy on the client, after the alteration of the data copy on the client, at the same time as the alteration of the data copy on the client, etc.

Further, in one embodiment, during a second synchronization of the data with the server after the first synchronization, it may be determined that both the copy of the data on the client and the copy of the data on the server have been separately altered since the last synchronization of the data between the server and the client.

Further still, a shown in operation 106, the data conflict is resolved. In one embodiment, resolving the data conflict may include determining which of two conflicting copies of data is to be stored within the system. For example, if identical copies of data stored on both a client and server of a system are both independently altered before a synchronization is performed, resolving the data conflict may include determining whether the data copy stored on the client or the data copy stored on the server is to be saved in the system, whether both data copies are to be saved in the system, etc.

Also, in one embodiment, the data conflict may be resolved utilizing a user interface (UI). For example, the data conflict may be presented to, and manually resolved by, a user of the system utilizing a conflict resolution UI. In another embodiment, the may list a plurality of data conflicts, and the user may choose which data conflicts to manually address. In yet another embodiment, the user may select from one or more possible resolutions for the data conflict from within the UI. In still another embodiment, the user may perform one or more additional operations associated with resolving the data conflict utilizing the UI. For example, the user may send a message to another entity within the system regarding the conflict. In another example, the user may save a copy of the chosen resolution of the data conflict within the system. In this way, the user interface may assist the user in manually resolving the data conflict.

In addition, in one embodiment, the data conflict may be resolved automatically. For example one or more programs may be created utilizing a toolkit as part of an application programming interface (API) to address the data conflict. In another embodiment, the one or more programs may automatically resolve the data conflict based on one or more criteria. For example, the one or more programs may resolve the data conflict based on a time and date of data modification, entity priority within the system, the type of data in conflict, an organization associated with the data, etc. In this way, the data conflict may be included within a large volume of data conflicts which may be automatically resolved by the one or more programs and may not have to be manually addressed by a user of the system.

Figure 2:
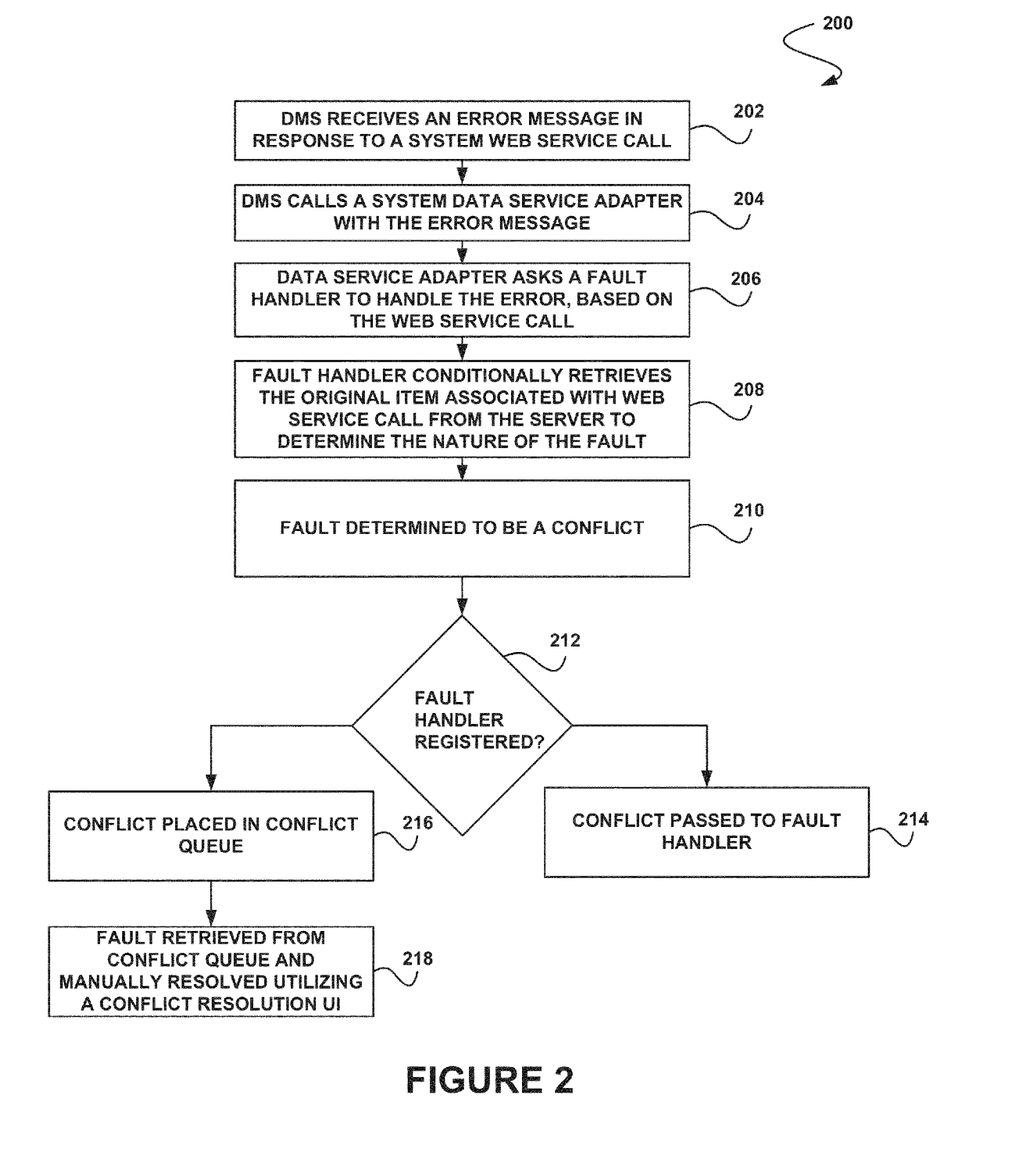
FIG. 2 illustrates method for performing error detection, in accordance with another embodiment.

FIG. 2 illustrates a method 200 for performing error detection, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a data management service (DMS) receives an error message in response to a system web service call. In one embodiment, the system web service call may include a request to synchronize data between a client and server of the system. In another embodiment, the error message may be received after the request to synchronize the data has failed. In yet another embodiment, the error message may be received in response to replaying an uncommitted queue during an online commit, where a data service adapter may invoke a web service API calls.

Additionally, as shown in operation 204, the database management service calls a system data service adapter with the error message. Further, as shown in operation 206, the data service adapter asks a fault handler to handle the error, based on the web service call. Further still, as shown in operation 208, the fault handler conditionally retrieves the original item associated with the web service call from the server to determine the nature of the fault. In one embodiment, the decision may be based on a type of the web service call involved, the error message (e.g., an error code within the error message, etc.), etc. In this way, unnecessary operations may be avoided (e.g., attempting to access an item from the server that the error code notes has been deleted from the server, etc.).

Also, as shown in operation 210, the fault is determined to be a conflict. For example, it may be determined that identical copies of a file stored at both a client and a server of the system have each been modified independently of each other after a synchronization including those files has been performed. In another example, it may be determined that data that is attempted to be modified has been modified on the server since the last synchronization. In one embodiment, the determination may be made by retrieving the data associated from the web service call from a client and server of the system, comparing the data, and determining that such data is different at the server and client.

In addition, as shown in decision 212, it is determined whether a fault handler is registered. In one embodiment, the fault handler may be user-defined. For example, a user of the system may utilize one or more of a template, user interface, a system toolkit, and an application programming interface (API) to create a fault handler to resolve conflicts within the system. In another embodiment, the fault handler may include code that makes decisions regarding conflicting data within the system without having to prompt a user.

Furthermore, if it is determined in decision 212 that a fault handler is registered, then in operation 214, the conflict is passed to the fault handler. In one embodiment, a conflict or error context may be passed to the fault handler. In another embodiment, one or more fields associated with the conflict may be identified to the fault handler. For example, fields associated with an item that include conflicting data may be identified to the fault handler. In this way, specific information associated with the conflict may be provided to the fault handler. In yet another embodiment, one or more algorithms created by a developer of the system may determine which data is to be saved among the conflicting data.

For example, the fault handler may apply an algorithm that compares an item at the client to the conflicting item at the server and selects one of the items to be saved to both the client and the server. In one embodiment, the algorithm may default to the data stored at the client or the server. In another embodiment, the algorithm may select the data that has been saved at the latest date. In still another embodiment, the algorithm may select the data based on a type of the data, an organization in which the data is stored, or any other criteria. In this way, the conflict may be programmatically resolved without manual decision-making. In yet another embodiment, the fault handler may revert to the operation that produced the fault, handle the fault in an application (e.g., by displaying an error message on the screen, etc.), put the fault in a conflict queue to be later handled manually, etc.

Figure 3:
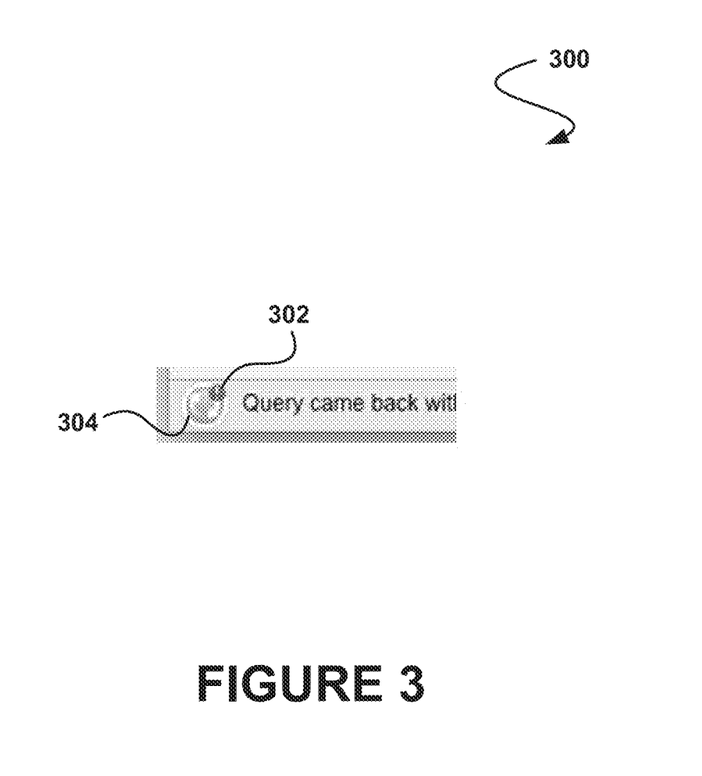
FIG. 3 illustrates an example of an icon on top of a synchronization button, in accordance with another embodiment.

Further still, if it is determined in decision 212 that a fault handler is not registered, then in operation 216 the conflict is placed in a conflict queue. Additionally, as shown in operation 218, the fault is retrieved from the conflict queue and is manually resolved utilizing a conflict resolution user interface (UI). In one embodiment, the conflict resolution UI (CRUI) may allow users to visually resolve conflicts and/or errors which happened during the sync process. For example, when conflicts and/or errors are detected, a status bar at the bottom of an application may display a colored icon on top of a button used to synchronize data. FIG. 3 illustrates an example of an icon 302 on top of a synchronization button 304. In another example, pressing this button may show the CRUI. In another embodiment, the CRUI may show all the items in the conflict queue and users may have a chance to take action to resolve these conflicts.

Also, in one embodiment, users may not be forced to resolve conflicts. For example, having unresolved conflicts and/or errors may not preclude users from continuing to work with one or more software applications on a client. In another embodiment, users may continue modifying, creating, and/or deleting items, so long as they are not trying to save an item in conflict.

Figure 4:
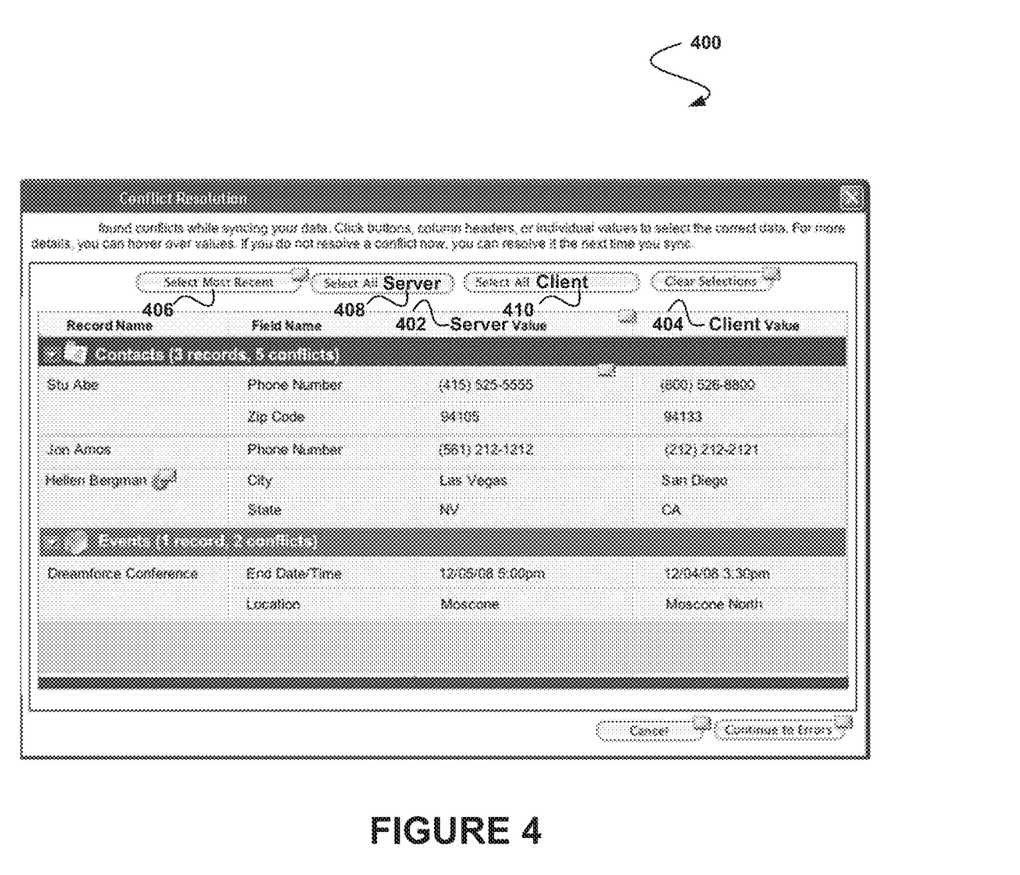
FIG. 4 illustrates a conflict overview screen of a conflict resolution user interface, in accordance with another embodiment.

FIG. 4 illustrates a conflict overview screen 400 of a conflict resolution user interface, in accordance with another embodiment. As an option, the screen 400 may be carried out in the context of the functionality of FIGS. 1-3. Of course, however, the screen 400 may be carried out in any desired environment. The aforementioned definitions may apply during the present description.

As shown, the conflict overview screen 400 allows users to see an overview of all unresolved synchronization conflicts that have occurred by comparing a server value 402 of an object with a client value 404 of the object. In one embodiment, a user may select the "select most recent" icon 406 of the screen 400, which may select conflicting values that have occurred most recently. In another embodiment, the user may select the "select all server" icon 408 or the "select all client" 410 icon of the screen 400, which may select conflicting values stored at the server or the client, respectively. In this way, user may resolve conflict globally. In yet another embodiment, users may resolve conflicts by creating blended records (e.g., a mixture of server and client values, etc.).

Figure 5:
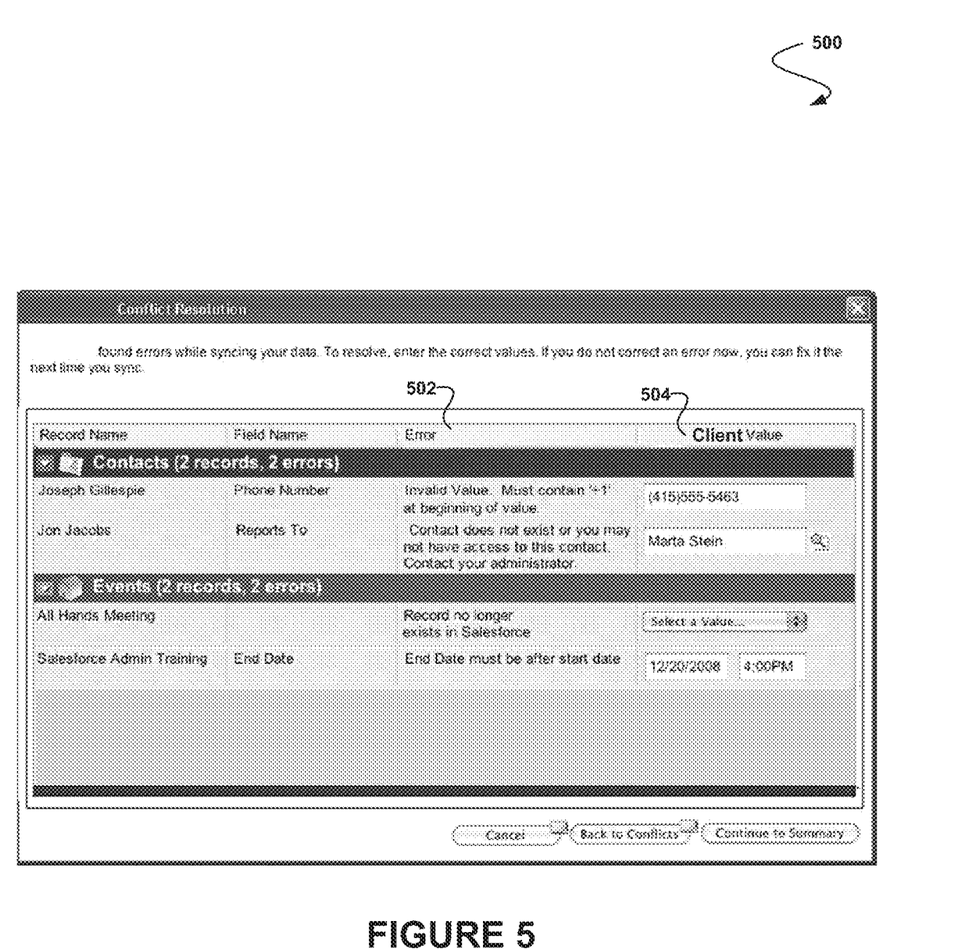
FIG. 5 illustrates a conflict error screen of a conflict resolution user interface, in accordance with another embodiment.

FIG. 5 illustrates a conflict error screen 500 of a conflict resolution user interface, in accordance with another embodiment. As an option, the screen 500 may be carried out in the context of the functionality of FIGS. 1-4. Of course, however, the screen 500 may be carried out in any desired environment. The aforementioned definitions may apply during the present description.

As shown, the conflict error screen 500 includes an error column 502. In one embodiment, the error column 502 may provide a detailed view into specific errors and related error messages. Additionally, the conflict error screen 500 includes a client value column 504. In another embodiment, a user may resolve conflict errors by entering a new/correct value for conflict fields on records within the client value column 504.

Figure 6:
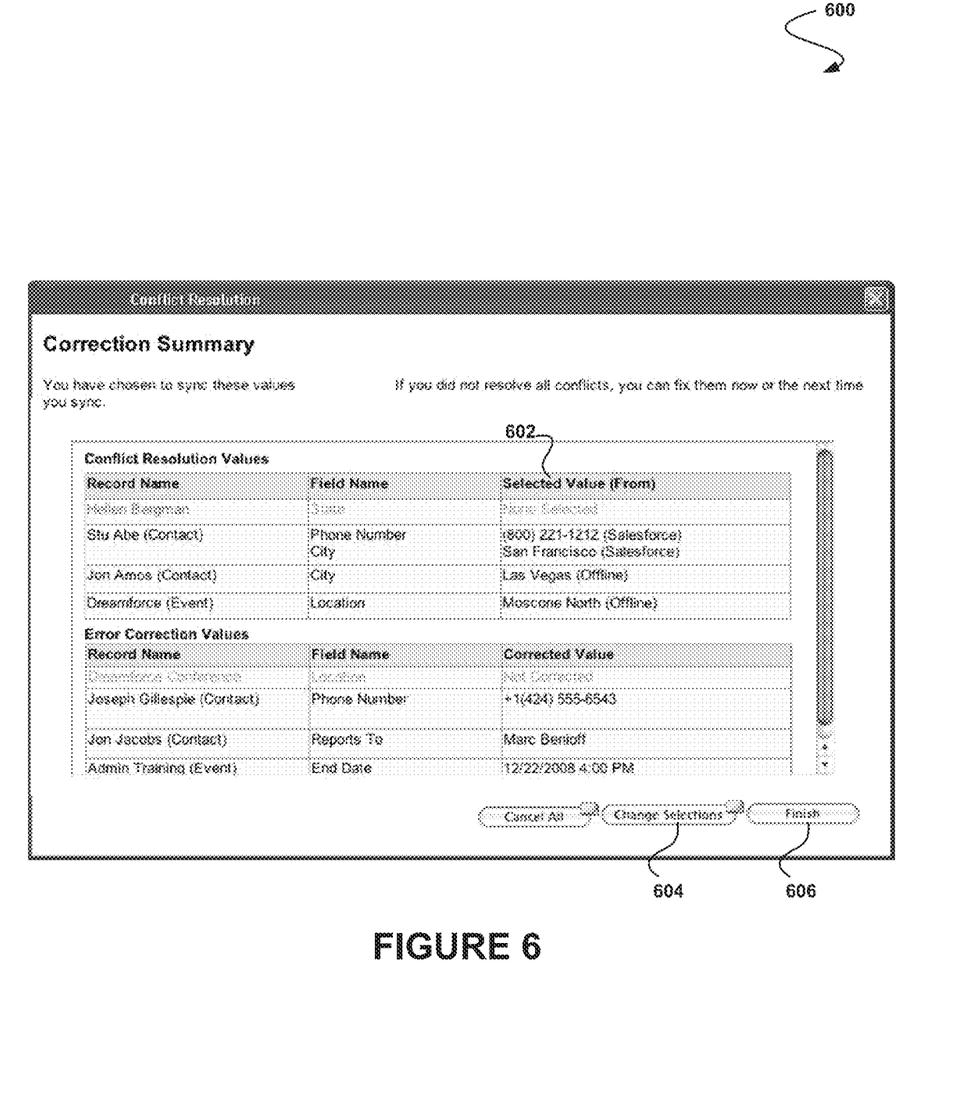
FIG. 6 illustrates a conflict summary screen of a conflict resolution user int rface, accordance with another embodiment.

FIG. 6 illustrates a conflict summary screen 600 of a conflict resolution user interface, in accordance with another embodiment. As an option, the screen 600 may be carried out in the context of the functionality of FIGS. 1-5. Of course, however, the screen 600 may be carried out in any desired environment The aforementioned definitions may apply during the present description.

As shown, the conflict summary screen 600 includes a summary column 602 which may include a summary of how a user resolved one or more conflicts. In one embodiment, a user may go back to a previous screen to change selections by selecting the "change selections" icon 604 of the screen 600. In another embodiment, a user may commit their conflict resolution selections for re-synchronization by selecting the "finish" icon 606 of the screen 600. In this way, a user may manually resolve data conflicts between a client and server.

In this way, the system may discriminate between data conflicts and errors, and may provide for resolution through either programmatic or GUYI wizard means. In another embodiment, conflicts and errors discovered by the server may be received, exception information may be correlated to the original records, and the records may be routed to the appropriate handlers. In yet another embodiment, a full GUI wizard may be provided that may guide users through the process of identifying and resolving client/server data conflicts. The wizard may separate the records by type, and then may identify each conflicted field and/or manage conflicts on dependent picklists, etc. The user may be able to select the appropriate client or server value to resolve the conflict. Another path may allow platform developers to specify their own resolution mechanisms. The information relevant to each conflict may be passed to their callback methods through a standardized API and they may be responsible for programmatically indicating how they would like the conflict to be resolved.

System Overview

Figure 7:
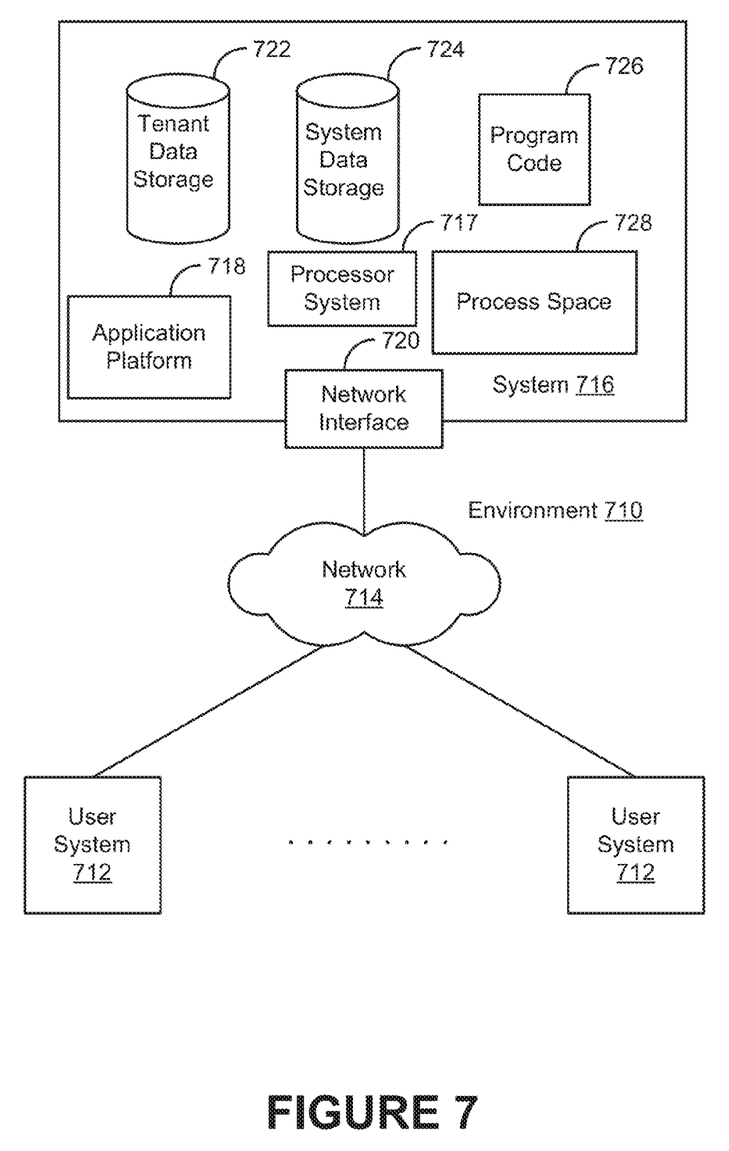
FIG. 7 illustrates a block diagram of an example of an environment wherein an on-demand database system might be used.

FIG. 7 illustrates a block diagram of an environment 710 wherein an on-demand database system might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database system exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database system, which is system 716.

An on-demand database system, such as system 716, is a database system that is made available to outside users that do not need to necessarily be concerned with building and/or maintaining the database system, hut instead may be available for their use when the users need the database system (e.g., on the demand of the users). Some on-demand database systems may store information from one or more tenants stored into tables of a common database image to form a multi-tenant database system (MTS). Accordingly, "on-demand database system 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database system 716 may include an application platform 718 that enables creation, managing and executing one or more applications developed by the provider of the on-demand database system, users accessing the on-demand database system via user systems 712, or third party application developers accessing the on-demand database system via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS. WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
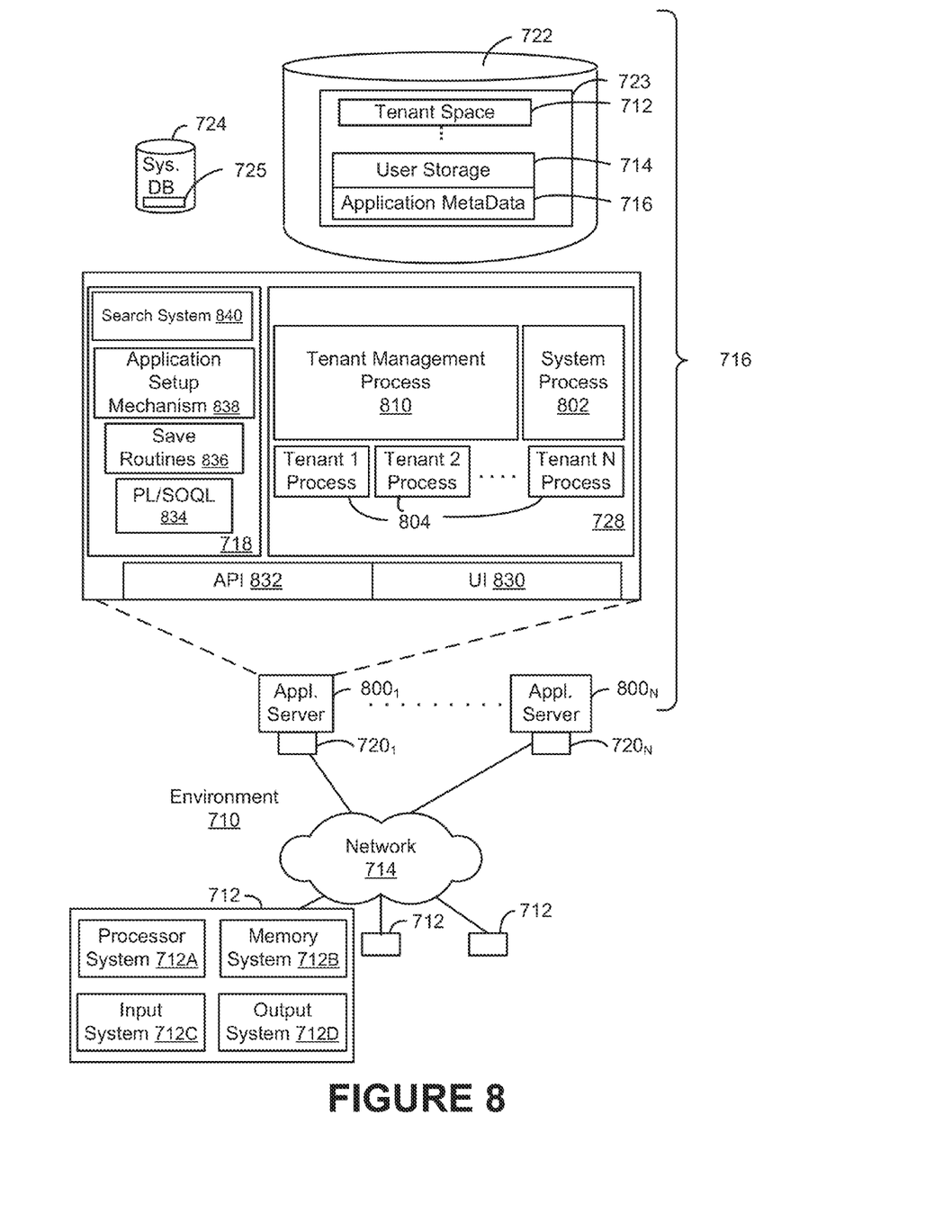
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 71213, input system 712C, and output system 712D. FIG. 8 shows network 714 and system 716. FIG. 8 also shows that system 716 may include tenant data storage 722, tenant data 723, system data storage 724, system data 725, User interface (UI) 830, Application Program interface (API) 832, PL/SOQL 834, save routines 836, application setup mechanism 838, applications servers 800$_1$-800$_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for resolving a data conflict, the method comprising:
   detecting a synchronization error within a system;
   determining that the synchronization error includes a data conflict;
   determining whether a fault handler is registered within the system;
   if it is determined that a fault handler is registered within the system, passino the data conflict to the fault handler; and
   if it is determined that a fault handler is not registered within the system, placing the data conflict in a conflict queue.

2. The computer program product of claim 1, wherein the synchronization includes an exchange of data between a client of the system and a server of the system.

3. The computer program product of claim 2, wherein a copy of the same data is stored at both the client and the server of the system, and both copies are periodically synchronized.

4. The computer program product of claim 1, wherein the synchronization is performed utilizing one or more application programming interface (API) calls.

5. The computer program product of claim 1, wherein an error message is received in response to a failed synchronization between a client and server within the system.

6. The computer program product of claim 1, wherein an error message received in response to the synchronization error indicates that such synchronization error is the result of the data conflict.

7. The computer program product of claim 1, wherein the data conflict includes a conflict of data between a server of the system and a client of the system.

8. The computer program product of claim 7, wherein the computer program product is operable such that identical copies of data are stored at both the client and the server of the system, and after a first synchronization is performed, the data copy stored on the client is altered and the data copy stored on the server is also altered in a different manner than the data copy stored on the client.

9. The computer program product of claim 1, wherein the fault handler resolves the data conflict by determining which of two conflicting copies of data is to be stored within the system.

10. The computer program product of claim 1, wherein the fault handler resolves the data conflict by determining whether a data copy stored on a client or a data copy stored on a server is to be saved in the system if identical copies of data stored on both the client and the server of the system are both independently altered before a synchronization is performed.

11. The computer program product of claim 1, wherein the data conflict is resolved utilizing a user interface (UI).

12. The computer program product of claim 11, wherein the data conflict is presented to, and manually resolved by, a user of the system utilizing a conflict resolution UI.

13. The computer program product of claim 11, wherein the UI lists a plurality of data conflicts, and a user chooses which data conflicts to manually address.

14. The computer program product of claim 11, wherein the user selects from one or more possible resolutions for the data conflict from within the UI.

15. The computer program product of claim 11, wherein the user performs one or more additional operations associated with resolving the data conflict utilizing the UI.

16. The computer program product of claim 1, wherein the data conflict is resolved automatically.

17. The computer program product of claim 1, wherein the computer program product is operable such that one or more programs are created utilizing a toolkit as part of an application programming interface (API) to address the data conflict.

18. The computer program product of claim 17, wherein the one or more programs automatically resolve the data conflict based on one or more criteria.

19. The computer program product of claim 1, wherein the fault handler, in response to receipt of the data conflict, resolves the data conflict based on a time and date of data modification.

20. The computer program product of claim 1, wherein the fault handler, in response to receipt of the data conflict, resolves the data conflict based on an entity priority within the system.

21. The computer program product of claim 1, wherein the fault handler, in response to receipt of the data conflict, resolves the data conflict based on a type of the data in conflict.

22. The computer program product of claim 1, wherein the fault handler, in response to receipt of the data conflict, resolves the data conflict based on an organization associated with the data conflict.

23. A method, comprising:
  detecting a synchronization error within a system;
  determining that the synchronization error includes a data conflict; and
  determining whether a fault handler is registered within the system;
  if it is determined that a fault handler is registered within the system, passing the data conflict to the fault handler; and
  if it is determined that a fault handler is not registered within the system, placing the data conflict in a conflict queue,
  utilizing a processor.

24. An apparatus, comprising:
  a processor for:
    detecting a synchronization error within a system;
    determining that the synchronization error includes a data conflict; and
    determining whether a fault handler is registered within the system;
    if it is determined that a fault handler is registered within the system, passing the data conflict to the fault handler; and
    if it is determined that a fault handler is not registered within the system, placing the data conflict in a conflict queue.

25. A method for transmitting code for use in a multi-tenant database system on a transmission medium, the method comprising:
  transmitting code for detecting a synchronization error within a system;
  determining that the synchronization error includes a data conflict; and
  determining whether a fault handler is registered within the system;
  if it is determined that a fault handler is registered within the system, passing the data conflict to the fault handler; and
  if it is determined that a fault handler is not registered within the system, placing the data conflict in a conflict queue,
  utilizing a processor.

* * * * *